United States Patent [19]
Sarson

[11] 3,984,132
[45] Oct. 5, 1976

[54] BULKHEAD FITTING
[75] Inventor: Charles Robert Sarson, Euclid, Ohio
[73] Assignee: The Weatherhead Company, Cleveland, Ohio
[22] Filed: Feb. 27, 1975
[21] Appl. No.: 553,643

[52] U.S. Cl............................. 285/222; 29/523; 29/509; 85/70; 85/72; 403/2; 403/248
[51] Int. Cl.² ........................................ F16L 41/00
[58] Field of Search ........... 85/70, 72; 29/523, 512, 29/509; 285/222, 382.4, 382.5; 403/197, 2, 248

[56] References Cited
UNITED STATES PATENTS

| | | | |
|---|---|---|---|
| 2,195,029 | 3/1940 | Hathorn | 85/70 |
| 2,266,611 | 12/1941 | Martin et al. | 285/222 X |
| 3,365,998 | 1/1968 | Zahodiakin | 85/72 X |
| 3,465,637 | 9/1969 | Cushman et al. | 85/72 |
| 3,754,731 | 8/1973 | Mackal | 285/222 X |

Primary Examiner—Charlie T. Moon
Attorney, Agent, or Firm—McNenny, Pearne, Gordon, Gail, Dickinson & Schiller

[57] ABSTRACT

A unitary tubular fitting body and cooperating mandrel for installation on a blind wall. The body includes an axially collapsible tube portion which during installation draws up the body into alignment with the wall. The body includes a frangible ring dimensioned to fail after adequate compression force is applied on the collapsing tube portion for full sealing engagement with the wall. Failure of the ring releases the mandrel and prevents overtightening of the fitting.

5 Claims, 3 Drawing Figures

BULKHEAD FITTING

BACKGROUND OF THE INVENTION

The invention relates to a tubular fitting and method for its installation, and, more specifically, to a fitting and method particularly suited for use where access to only one side of a wall is available.

PRIOR ART

It is often desirable to mechanically secure a tubular fitting in fluid-tight relation to a hole in an otherwise imperforate wall to provide communication between zones on opposite sides of the wall. In certain situations, such as with a closed tank or other vessel, the fitting receiving hole may be blind, i.e., access to only one side of the wall is available. Further, a vessel or other wall structure may be too thin to be tapped with female threads and, because of its environment or for other reasons, may not be readily soldered, brazed, welded, or otherwise bonded with a fitting.

One prior art type of fitting for a blind hole is shown in U.S. Pat. No. 2,150,361 to Chobert. This type of fitting employs a draw-through mandrel to flare a portion of the fitting body radially outwardly into engagement with the blind side of the wall. A disadvantage of this type of fitting is that only a limited degree of forced axial displacement of the flared portion of the fitting is developed so that little or no axial pull-up of the fitting against the wall is produced. Limited axial displacement hinders successful sealing engagement of the fitting on the wall and requires that a seal be effected primarily on a radial boundary of the hole which may have uncertain definition, concentricity, and surface finish. The prior art also includes, for example, U.S. Pat. Nos. 587,546 to Dillenburg, 2,398,041 to Russell, 3,257,889 to Fischer, 3,339,014 to Oxley, 3,340,762 to Bennett, and 3,434,746 to Watts.

SUMMARY OF THE INVENTION

The invention provides a tubular fitting for mechanical assembly to a hole in a wall from operations conducted on one side of the wall. The fitting includes an axially deformable portion which is arranged to draw up a radial shoulder of the body into tight abutting contact with a face of the wall. This draw-up action provides self-alignment of the fitting to the wall, which is particularly advantageous where the fitting is installed in the field under awkward or confined conditions. Axial compression of the fitting against the wall area surrounding the hole allows the fitting to be reliably sealed against a broad zone on the face of the wall.

The fitting body also includes a stress failure section which releases a draw-up mandrel after the axially deformable portion has been collapsed to give a positive indication that adequate compressive sealing forces have been developed. As disclosed, the fitting preferably includes an integral tubular body having, in axial relation, a radial shoulder, a deformable thin wall portion, and a frangible shear ring portion. A mandrel having a head diameter somewhat larger than the inside diameter of the frangible ring and a stem extending through the fitting is adapted to be pulled rearwardly through the fitting.

With the fitting extending through a suitable aperture in a wall, the thin wall portion is compressed into buckling deformation by forces developed by the mandrel. As the mandrel is drawn tight, the deformable portion buckles radially outwardly and moves axially against the blind face of the wall such that the boundary of the hole is squeezed between the shoulder and buckled material. The frangible ring portion is arranged with a failure strength at least as high as that necessary to compress the thin wall deformable portion with enough force to secure the fitting in fixed sealing relationship with the wall. Failure of the frangible ring and consequent release of the mandrel through the fitting indicate satisfactory completion of the installation and prevent excess compression of the fitting.

DESCRIPTION OF THE PREFERRED EMBODIMENTS

Figure 1:
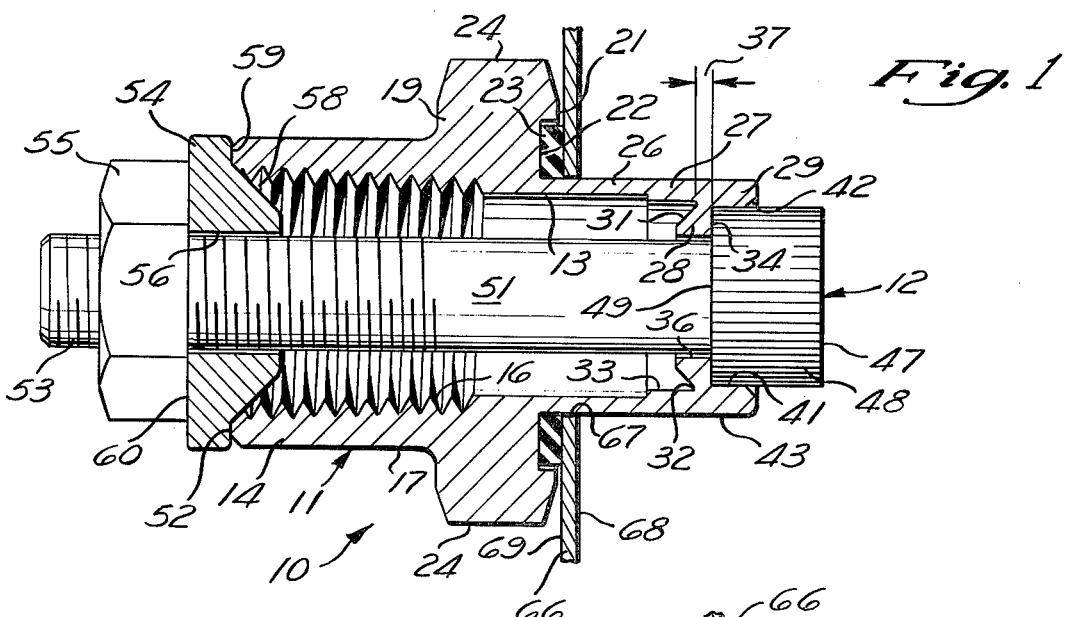
FIG. 1 is a longitudinal cross-sectional view of a fitting and mandrel assembly in accordance with a first embodiment of the invention.

Referring to FIG. 1, there is shown an assembly 10 including a tubular fitting 11 and an installation mandrel 12. The fitting 11 is an integral one-piece body formed of a ductile material, preferably a metal such as annealed brass. The body of the fitting includes a through bore 13. A major rearward portion 14 of the body 11 is internally threaded at 16 with tapered pipe threads, and is formed with a cylindrical exterior surface 17. The terms "rearward" and "forward" are used herein with reference to the direction of installation movement of the fitting 11 described below. A radial shoulder 19 of the body 11 forms the major transverse cross section or circumscribed diameter of the body. A forward radial face 21 of the shoulder 19 is machined or otherwise formed with an annular recess 22 for reception therein of a washerlike gasket seal 23. The exterior of the shoulder 19 is provided with at least a pair of diametrically opposite flats 24 to be engaged by a suitable wrench to prevent rotation of the fitting 11 when a member is tightened into the threads 16.

A thin wall cylindrical section 26 of the fitting 11 extends forwardly from the base of the recess 22. Contiguous with a forward end of the thin wall section 26 is a cylindrical, intermediate wall thickness section 27. A frangible ring 28 is contiguously formed at a forward end of the intermediate section 27 and provides a transition zone between the intermediate section and a relatively heavy wall cylindrical section 29.

The frangible ring 28 is an annular structure having an undercut at a conical surface 31 which provides a stress riser condition at a circular junction 32 with an inner surface 33 of the intermediate wall section 27. The ring 28 is further defined by a radial surface 34 and an inner bore 36 forming the minimum inner diameter of the fitting 11. A circumferential shear zone 37 extends axially between the radial face 34 of the frangible ring 28 and the circular stress raising juncture 32. The entrance to a cylindrical bore 41 of the heavy wall section 29 is chamfered at 42 to facilitate positioning of the mandrel 12 therein. As shown, all of the cylindrical wall portions 26, 27, and 29 are defined by a common cylindrical exterior surface 43. A head portion 47 of the mandrel 12 has an outer generally cylindrical surface 48 dimensioned to be retained in the associated fitting bore 41 by a press fit. The outer head surface 48 is knurled to prevent rotation of the mandrel 12 in the fitting 11.

A radial shoulder 49 at the rear face of the mandrel head 47 abuts the radial surface 34 of the frangible ring 28. A cylindrical mandrel stem 51 integral with the head 47 extends rearwardly through the bore 13 of the fitting 11, to a point beyond an end face 52 of the fitting. A rearward section of the stem 51 is threaded at 53. Assembled on the stem 51 are a bushing 54 and threaded hexagonal nut 55. The bushing 54 has a central bore 56 providing a loose fit on the stem 51. A forward face of the bushing 54 is formed with a conical surface 58 concentric with the bore 56 to provide centering action on the fitting bore 13 and thereby align the threaded end 53 of the mandrel stem 51. A radial annular surface 59 of the bushing 54 peripheral of the conical surface 58 abuts the end face 52 of the fitting 11 to transmit axial compressive forces to the fitting. The rear face of the bushing 54 is formed by a radial surface 60 in abutting engagement with the nut 55.

As shown in FIG. 1, the gasket 23 when unrestrained has an axial length somewhat greater than the depth of the recess 22. An outer diameter of the gasket 23 is somewhat less than the outer diameter of the recess 22 while the inside gasket diameter is substantially equal to the outer diameter of the thin wall body section 26. The protrusion of the basket 23 beyond the radial fitting face 21 permits it to be axially compressed to a limited degree upon installation of the fitting assembly to ensure positive seating against a wall. Ideally, the gasket is formed of a material such as ethylene propylene having a low compression set and low swell characteristics in its intended environment.

The fitting 11 may be assembled on a wall 66, such as that illustrated in the figures, which is relatively thin in comparison to the axial length of the cylindrical thin wall fitting section 26. A hole 67 is first drilled or otherwise formed in a suitable location in the wall 66. The heavy wall end section 29 of the fitting 11, with the seal, mandrel, nut, and bushing previously assembled on the fitting, is inserted forwardly into the hole until the seal 23 abuts the wall 66. The nut 55 is subsequently turned by a wrench or other tool to tighten it on the stem 51 against the bushing 54, while a second wrench or tool in engagement with the flats 24 on the shoulder 19 is used to prevent the fitting 11 from turning on the wall 66.

Figure 2:
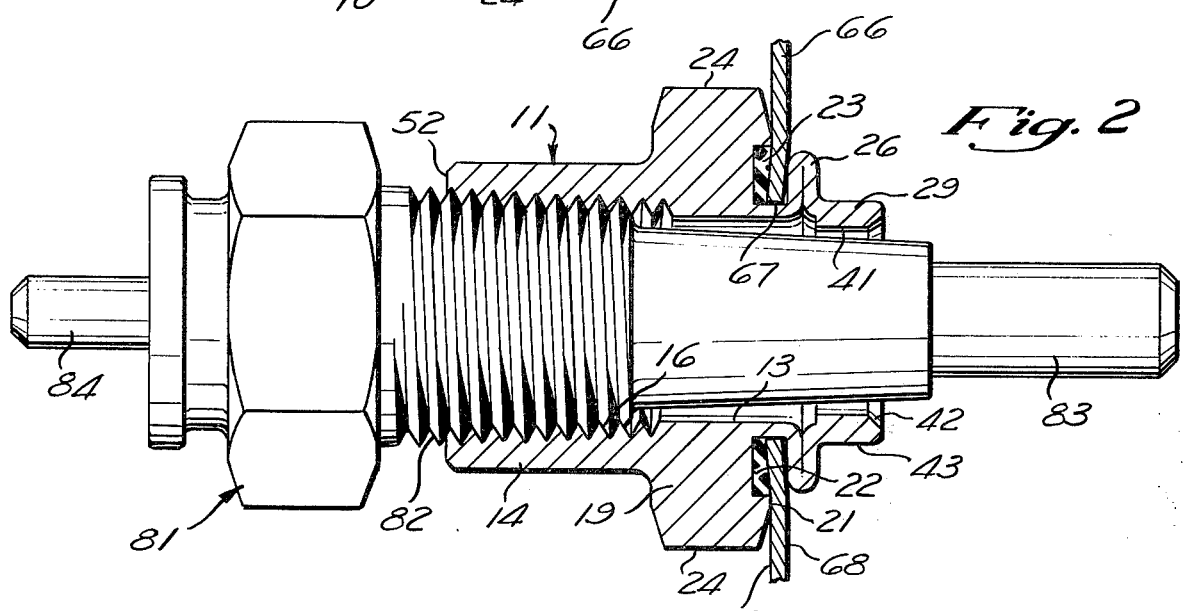
FIG. 2 is a longitudinal sectional view of the fitting of FIG. 1, after completion of installation, carrying a probe for communication between zones on opposite sides of the wall.

Upon tightening of the nut 55 on the threaded mandrel portion 53, the fitting 11 is placed in axial compression by the action of the nut on the bushing 54 as the mandrel head 47 is drawn rearwardly toward the wall 66. Interference between the radial surface 34 of the frangible ring 28 and the head 47 prevents immediate passage of the head through the fitting 11. As axial compressive forces in the thin wall section 26 increase, this section, by virtue of its relative dimensions, is caused to deform by buckling radially outwardly and axially rearwardly toward the wall 66. As illustrated in FIG. 2, eventually the thin wall section 26 is drawn by the mandrel sufficiently tight against an associated inner face 68 of the wall 66 to axially compress the gasket 23 into the recess 22 and thereby ensure that adequate sealing engagement is developed by the gasket against an associated outer face 69 of the wall 66. Radial expansion of the gasket seal 23 due to its axial compression is accommodated by the relatively larger diameter of the recess 22. Where the wall 66 is relatively thin, it may be locally deflected into the recess 22, as shown in FIG. 2, under the load imposed by the mandrel and buckling wall section 26. This condition, or the absence of such a condition, when the assembly is installed on a relatively thick and/or stiff wall, is taken into consideration in the selection of the thickness of the gasket seal 23.

The circumferential shear zone 37 is dimensioned to withstand at least this axial load for a positive seal before its ultimate shear stress is reached. The ring 28, moreover, is dimensioned to fail at the zone 37 before excess compression of the deformable material of the seal 23 and the thin wall section 26 is produced to avoid possible extrusion of the seal or other damage. Tightening of the nut 65 is continued until the ultimate shear stress of the zone 37 is developed and the mandrel 12 is pulled free with the ring 28 through the fitting bore 13, leaving a minimum fitting bore corresponding to the forward bore 41. Rupture of the ring 28 indicates that tightening of the fitting 11 on the wall 66 is complete.

A dimensional example of a fitting of annealed brass which has been successfully used is characterized by a thin wall section 26 having an outside diameter of 0.373 inch and an inside diameter of 0.333 inch, resulting in a nominal wall thickness of 0.020 inch. The length of the thin wall section is 0.183 inch. The intermediate wall section has an inside diameter of 0.324 inch, while the inside diameter of the heavy wall section 29 is 0.315 inch. The circumferential shear zone 37 has an axial length of 0.032 inch. The intermediate section 27 is provided with a wall somewhat larger than the thin wall section 26 to prevent fracture of the wall 27 at or adjacent the area of the circular junction 32 and to control curvature of the thin wall section during its collapse.

The disclosed fitting 11 is useful for installation on walls or bulkheads for which access is available to only one side referred to above as the outer side or face 69. The fitting is especially suitable for installation where access is limited or awkward, since the axial draw-up of the deformable thin wall section 26 towards the shoulder 19 tends to axially tighten the shoulder and seal 23 on the wall surface to thereby overcome any lack of externally applied holding force or misalignment. One suitable application of the described fitting is installation on a tank portion of an automotive radiator to provide means for mounting a level sensor therein. Referring to FIG. 2, the wall 66 represents a section of an automotive radiator tank. A level sensor 81 of known construction has threads 82 compatible with the internal threads 16 of the fitting 11 so that the sensor may be tightened into fluidtight engagement with the fitting after the latter is installed in the manner described above. The fitting 11 provides communication between the interior of the tank represented by the zone on the right of the wall 66 and the atmosphere represented by the zone on the left. A probe 83 at the forward end of the level sensor 81 is thus adapted to sense the level of fluid in the radiator and transmit a signal, e.g., an electrical current, through the sensor 81 to an external pin contact 84.

Figure 3:
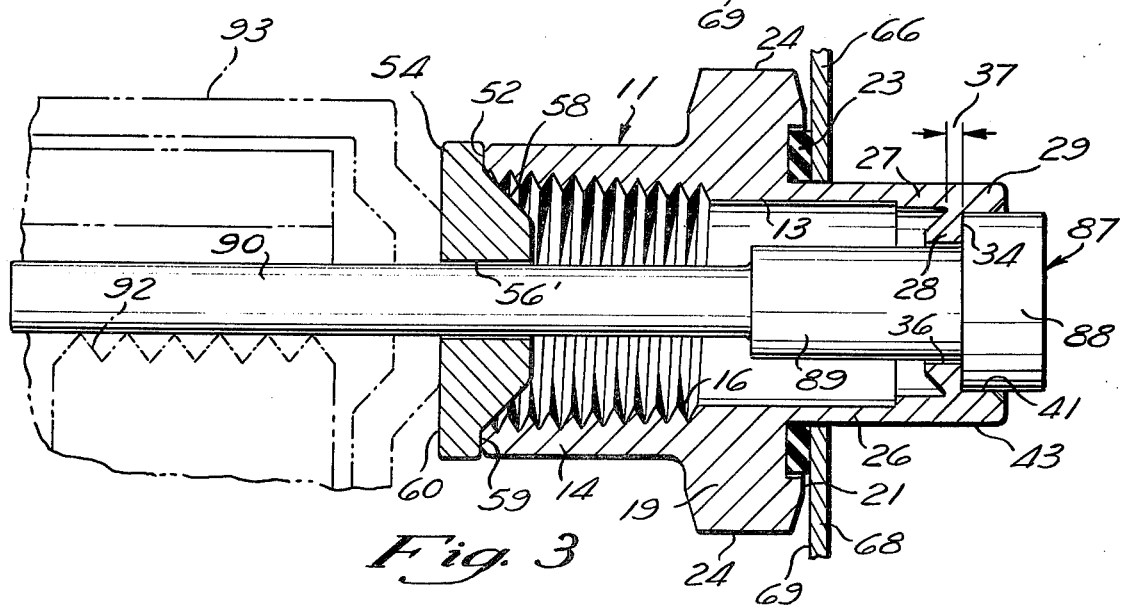
FIG. 3 is a longitudinal cross-sectional view of a fitting and mandrel assembly in accordance with a second embodiment of the invention.

A second embodiment of the invention is illustrated in FIG. 3. As shown, the fitting 11 and bushing 54 are substantially the same as those shown in FIG. 1 and common numerals have been used to indicate the same features. The bushing 54 has a bore 56' somewhat reduced in diameter from that shown in FIG. 1. A stepped diameter mandrel 87 of this embodiment includes a cylindrical major diameter head portion 88, an intermediate cylindrical portion 89, and an elongated stem portion 90. The mandrel head 88 is dimensioned slightly larger than the forward fitting bore 41 so that the mandrel is retained in the fitting with a press fit. The intermediate and stem portions 89 and 90 of the mandrel 87 pass through respective bores 36 and 56' of the frangible ring 28 and bushing 54 with slight clearance. The intermediate portion 89 provides additional support between the head portion 88 and the stem 90 to prevent bending of the latter. The elongated cylindrical stem 90 extends sufficiently rearwardly of the bushing 54 to permit it to be gripped by jaws 92, schematically shown in phantom, of an installation tool, outlined in phantom at 93, which may be of the type used for setting blind rivets. As shown, the tool 93 abuts and is axially supported by the radial face 60 of the bushing 54. The stem 90 is drawn incrementally or continuously leftwardly by the jaws 92. Ultimately, the thin wall portion 26 is caused to deform in substantially the same manner as that described above in connection with FIG. 1, until it assumes the condition illustrated in FIG. 2.

Although preferred embodiments of this invention are illustrated, it is to be understood that various other modifications and rearrangements of parts may be resorted to without departing from the scope of the invention claimed herein.

What is claimed is:

1. A fitting adapted to be secured to a wall through a hole, said fitting comprising a tubular body having an integral, radially extending shoulder portion, an integral, thin wall, collapsible tubular portion extending forwardly of the shoulder portion, said collapsible tubular portion being arranged to collapse by buckling radially outwardly and axially against the wall under an axial compressive load, an integral annular stress failure portion forwardly disposed of the collapsible tubular portion, said annular stress failure portion having an axial strength in excess of the load causing buckling of the collapsible portion and being arranged to transmit axial loads on it to said collapsible tubular portion, said annular stress failure ring being arranged to increase the effective minimum diameter of the bore of the fitting upon failure thereof under an axial load in excess of said buckling load, whereby a mandrel having an outer diameter greater than the minimum bore of the fitting upon failure of said ring is released through said fitting, said body being threaded for connection with a mating fitting body, said failure portion being arranged to result in a minimum body bore upon failure at least as small as said threads, said failure portion having a configuration adapted to fail by shear and separate from the remainder of said body when pulled axially toward said shoulder, said shoulder portion including a relatively thick wall compared to said collapsible thin wall portion, said body including an annular zone supporting said failure portion, said annular zone having a wall thickness greater than said collapsible thin wall portion, said failure portion being radially and axially disposed within said annular zone, said zone having a first inside diameter forward of said failure portion and a second larger inside diameter rearward of said failure portion.

2. A fitting as set forth in claim 1, wherein said threads are internal of said body and said failure portion is arranged to fail in shear along a circumferential line smaller in diameter than said threads.

3. A fitting as set forth in claim 2, wherein said shoulder portion carries sealing means for circumferentially sealing the zone surrounding the hole of the wall to which said fitting body is secured.

4. A fitting assembly comprising a tubular body having an integral radial shoulder portion, an integral thin wall collapsible tubular portion extending forwardly of the shoulder portion, said collapsible tubular portion being arranged to collapse by buckling radially outwardly and axially toward said shoulder portion under an axial compression load, a mandrel extending through the bore of said body, said mandrel having a head section forward of said collapsible tubular portion and a stem section extending from said head section to a point rearwardly of said fitting body and engageable by a pulling element at a rearward end of the fitting body, said mandrel head section having an outside diameter greater than a minimum diameter of the body forward of the collapsible tubular portion such that said head engages said minimum diameter portion of the body when pulled towards said shoulder portion and the collapsible tubular portion is loaded in compression by the force of engagement between said mandrel head section and the minimum diameter portion, and release means for permitting passage of the mandrel head portion through the bore of the body upon exertion of a force in excess of the buckling capacity of the collapsible tubular portion, said release means including material stress failure means, said stress failure means comprising an annular ring on said body adapted to fail in shear, said mandrel head portion being retained by a press fit in a body bore forward of said ring.

5. In combination, a unitary tubular fitting body having an external radial shoulder intermediate its ends, a thin wall collapsible tubular portion forward of said radial shoulder, said tubular portion being dimensioned to buckle radially outwardly and axially rearwardly toward said shoulder when axially compressed, an internal frangible ring forward of said thin wall collapsible tubular portion, a threaded portion rearward of said shoulder adapted to sealingly connect a compatibly threaded element to said body, a mandrel having a head portion forward of said frangible ring and larger in diameter than said ring, said mandrel having a stem portion extending from said head portion rearwardly through said body to a point external of a rearward end of said body, said ring being dimensioned to support an axial load at least as great as that required to collapse said tubular portion.

* * * * *